(12) United States Patent
Pauer et al.

(10) Patent No.: US 10,275,511 B2
(45) Date of Patent: Apr. 30, 2019

(54) METHOD FOR ANALYZING AND/OR EVALUATING AT LEAST ONE EVENT

(71) Applicant: Siemens Aktiengesellschaft, Munich (DE)

(72) Inventors: Steffen Pauer, Weissenburg (DE); Mikhail Roshchin, Feldkirchen (DE); Alexander Storl, Hetzles (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 902 days.

(21) Appl. No.: 14/669,133

(22) Filed: Mar. 26, 2015

(65) Prior Publication Data
US 2015/0286705 A1 Oct. 8, 2015

(30) Foreign Application Priority Data

Apr. 4, 2014 (EP) .................................... 14163511

(51) Int. Cl.
*G06F 17/30* (2006.01)
*H04L 29/06* (2006.01)
*H04L 29/08* (2006.01)

(52) U.S. Cl.
CPC .. *G06F 17/30598* (2013.01); *G06F 17/30076* (2013.01); *H04L 67/12* (2013.01); *H04L 69/04* (2013.01)

(58) Field of Classification Search
None
See application file for complete search history.

(56) References Cited

U.S. PATENT DOCUMENTS

| | | | |
|---|---|---|---|
| 2009/0144699 A1* | 6/2009 | Fendt | G06F 11/004 717/120 |
| 2012/0005542 A1* | 1/2012 | Petersen | G06F 11/0709 714/48 |
| 2013/0185592 A1 | 7/2013 | Fleming et al. | |
| 2015/0106324 A1* | 4/2015 | Puri | G06N 5/04 706/52 |

FOREIGN PATENT DOCUMENTS

| | | |
|---|---|---|
| DE | 19528067 C1 | 11/1996 |
| WO | WO-07036176 A1 | 4/2007 |

OTHER PUBLICATIONS

EPSR dated Dec. 14, 2014.

* cited by examiner

*Primary Examiner* — Belix M Ortiz Ditren
(74) *Attorney, Agent, or Firm* — Harness, Dickey & Pierce, P.L.C.

(57) ABSTRACT

A method is disclosed for analyzing and/or evaluating at least one event of a technical installation from a plurality of generated log files of an automation system of the technical installation. In at least one embodiment, the method includes determining a number of relevant log files based on at least one log parameter; encoding the relevant log files via at least one associated log code; determining at least one key parameter for the analysis and/or evaluation; identifying multiple relevant log files based on the at least one key parameter from the relevant log files; and grouping the relevant log files into a number of sequences of relevant log files based on the repetition rate of the key parameter in a time window to be analyzed.

23 Claims, 2 Drawing Sheets

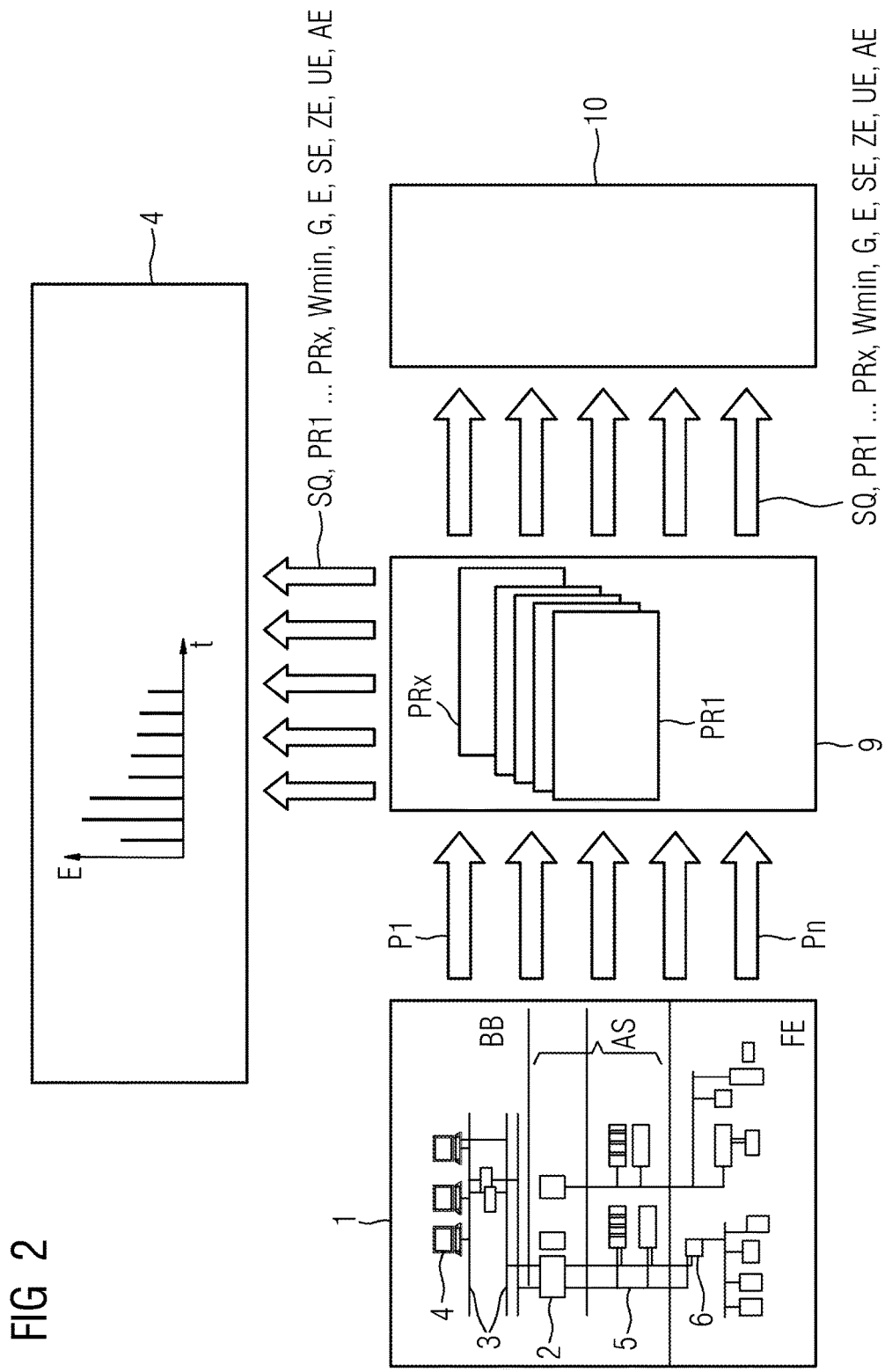

METHOD FOR ANALYZING AND/OR EVALUATING AT LEAST ONE EVENT

PRIORITY STATEMENT

The present application hereby claims priority under 35 U.S.C. § 119 to European patent application number EP 14163511.0 filed Apr. 4, 2014, the entire contents of which are hereby incorporated herein by reference.

FIELD

At least one embodiment of the invention generally relates to a method for analyzing and/or evaluating at least one event of a technical installation from a plurality of log files of an automation system of the technical installation, for example a power plant.

BACKGROUND

Large technical installations, such as steam and gas turbine installations, chemical installations, steelworks, rolling mills, are complex technical systems, which have a plurality of (e.g. several hundred) components, for example sensors, actuators, drives, etc., each of which may in some instances acquire and supply a number of measurement values per second for further processing and transmission.

To monitor and control components, such as turbines, evaporators, generators, sensors, drives, actuators, etc. of the technical installation, the data obtained from the components is processed, analyzed and interpreted. It is thus possible to identify deviations from a predetermined normal status as early as possible and where necessary prevent damage to and/or failure of the component, for example the turbine.

The quantity of data/measurement signals to be evaluated and the complexity of possible dependencies between the data/measurement signals here is generally much too great for an operator to be able to perform an effective analysis of the data/measurement signals.

The technical installation here comprises an automation system for controlling and monitoring the installation, said automation system generally being divided into an operating and observation level, an automation/process level and a field level, which are connected to one another by way of a communication unit, in particular one or more data bus systems.

The data, such as measurement signals, status signals of individual components, such as sensors, actuators, drives, turbines, automation units, etc., is generally brought together in log files, which describe one or more events that have occurred in one or more components and/or component groups, and transmitted to relevant components of the technical installation.

In practice automatic control and/or monitoring give(s) rise to the problem of an increasing number of generated log files when an event occurs in the technical installation, for example when there is a malfunction. Typical causes here are for example defective sensors and/or defective installation parts, which supply additional measurement values and therefore additional log files. This makes it difficult for operators to have an overview and be able to acquire the generated log files. It is also difficult for operators to assess the event that has occurred correctly.

SUMMARY

At least one embodiment of the invention is directed to a simple method for analyzing and/or evaluating at least one event from a plurality of log files of an automation system of a technical installation.

Preferred embodiments will emerge in particular from the dependent claims.

The inventive method of at least one embodiment, for analyzing and/or evaluating at least one event of a technical installation from a plurality of generated log files of an automation system of the technical installation, comprises:

determining a number of relevant log files from the plurality of generated log files based on at least one log parameter, in particular an acquisition time stamp, an acquisition time period, an acquisition type and/or an acquisition site, encoding the relevant log files based on at least one associated log code, in particular a chronological letter code, predetermining at least one key parameter for the analysis and/or evaluation of the at least one event, in particular predetermining for example a key event and/or a key time point/period, identifying, in particular filtering, multiple, in particular duplicated, relevant log files based on the at least one key parameter from the determined relevant log files, and grouping the relevant log files into a number of sequences of relevant log files based on the repetition rate of the key parameter, in particular temporal grouping/sorting of log files before the occurrence of the key parameter or after the occurrence of the key parameter.

The method is preferably used in an automation system of a technical installation, for example a power plant.

In one simple embodiment, the inventive method is implemented in a component of an automation system of a technical installation, with the automation system having at least one operating and observation level, an automation/process level and a field level, which are connected to one another by way of a communication system, with at least one embodiment of the method being implemented in at least one of the levels.

In at least one of the components of the automation system, a computer program product in particular is implemented, which can be loaded directly into a memory of a digital computer, such as a control unit, and comprises program code parts, which are suitable for performing steps of at least one embodiment of the method. Alternatively the computer program product can also be loaded into an automation device.

BRIEF DESCRIPTION OF THE DRAWINGS

The properties, features and advantages of this invention as described above and the manner in which they are achieved will become clearer and more readily understandable from the description which follows of example embodiments, which are explained in more detail in relation to the drawings, in which:

FIG. 2 shows a schematic diagram of an example embodiment of a method for analyzing and evaluating log files generated in the automation system.

Corresponding parts are shown with identical reference characters in all the figures.

DETAILED DESCRIPTION OF THE EXAMPLE EMBODIMENTS

Figure 1:
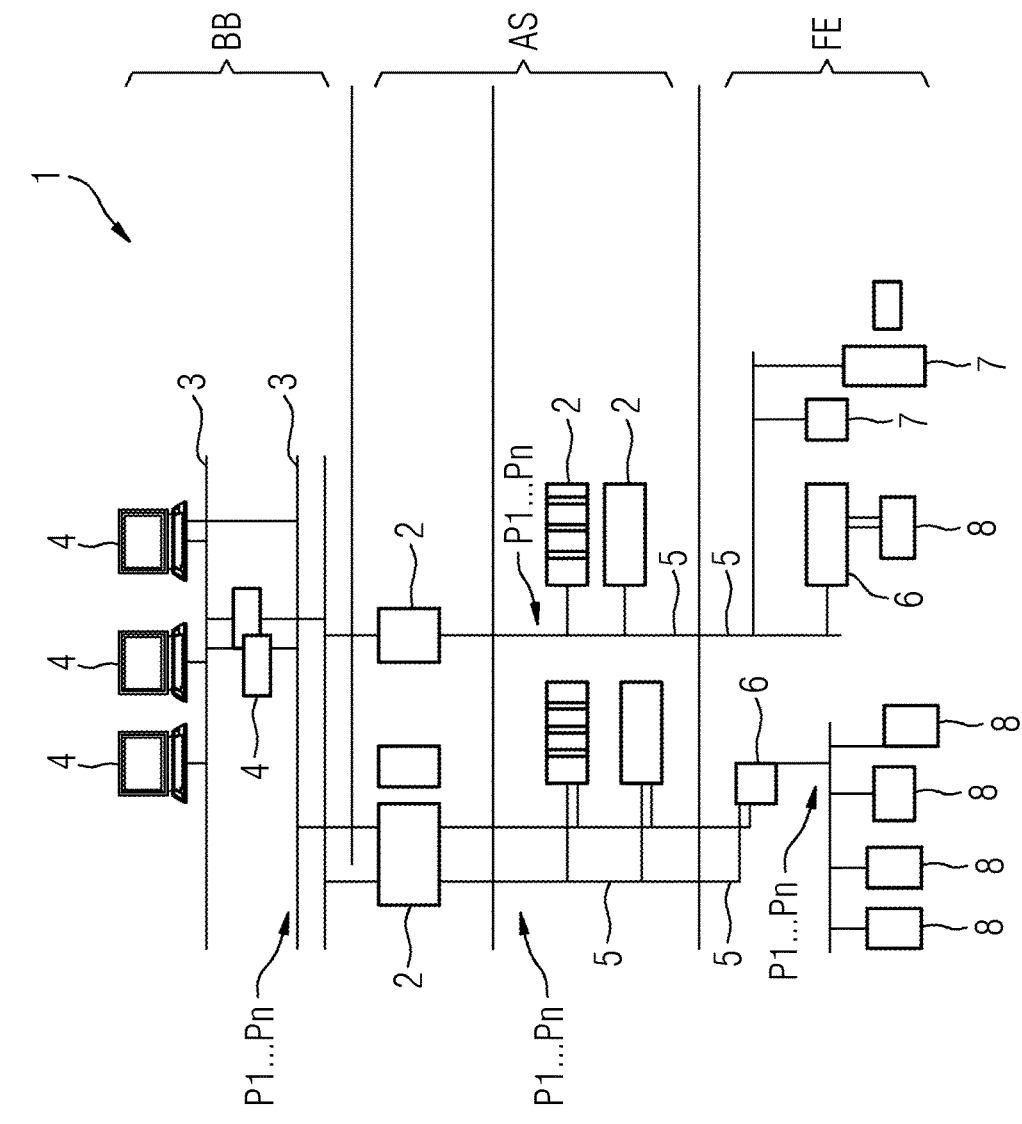
FIG. 1 shows a schematic diagram of an example embodiment of an automation system for controlling and monitoring a technical installation.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The inventive method of at least one embodiment, for analyzing and/or evaluating at least one event of a technical installation from a plurality of generated log files of an automation system of the technical installation, comprises:
  determining a number of relevant log files from the plurality of generated log files based on at least one log parameter, in particular an acquisition time stamp, an acquisition time period, an acquisition type and/or an acquisition site,
  encoding the relevant log files based on at least one associated log code, in particular a chronological letter code,
  predetermining at least one key parameter for the analysis and/or evaluation of the at least one event, in particular predetermining for example a key event and/or a key time point/period,
  identifying, in particular filtering, multiple, in particular duplicated, relevant log files based on the at least one key parameter from the determined relevant log files, and
  grouping the relevant log files into a number of sequences of relevant log files based on the repetition rate of the key parameter, in particular temporal grouping/sorting of log files before the occurrence of the key parameter or after the occurrence of the key parameter.

The inventive method of at least one embodiment allows a reduction in the plurality of generated log files to a sequence of grouped relevant log files. Such a reduction by filtering and sorting/grouping allows a simple and fast analysis of the individual log files in said sequence that are relevant to the event. In particular it is possible to determine simple dependencies of relevant log files in the determined sequences and/or their correlations.

In one development, during the initialization or setting up of the method a target event and a start event for at least one sequence of relevant log files are predetermined/determined as key parameters. The target event can also be predetermined as a key parameter, in particular as a key event, for the further analysis.

In a further embodiment, a minimum sequence length is predetermined for a sequence of relevant log files. For example the analysis is performed starting from the predetermined start event using the minimum sequence length for a minimum number of relevant log files in a sequence to be analyzed. This allows the analysis to be significantly shortened.

Additionally or alternatively a number of relevant log files can be brought together to form at least one group of relevant log files, in particular within a determined sequence. For example two or more relevant log files, which were generated at the same time point, can be brought together. This simplifies, in particular shortens, the analysis, as there is no need for the complex determination of time dependencies between the relevant log files.

At least one reference pattern is preferably determined for at least one of the sequences of relevant log files of a time period to be analyzed and/or an event to be analyzed. For recurring events, in particular statuses and/or process flows in a technical installation it is possible to determine at least one reference pattern, which describes or represents the order of the generated relevant log files describing said status and/or said process flow. This significantly simplifies the comparison and analysis of the generated log files.

Further relevant log files of further time periods to be analyzed and/or events to be analyzed that have been brought together in a sequence can then be compared and evaluated based on the reference pattern.

Alternatively or additionally the relevant log files of the time period to be analyzed and/or of the event to be analyzed that have been brought together to form a group can be compared and evaluated based on the reference pattern. In this process relevant log files of identical content and/or identical time can be grouped and brought together within a sequence of relevant log files. This further simplifies the already simplified analysis of sequences of relevant log files, in that a number of relevant log files are considered and analyzed more closely in groups within a sequence of relevant log files to be analyzed.

In a further embodiment, the determined number of recurring reference patterns and the determined number of key parameters are used to determine a minimum probability of occurrence (also referred to as minimum support). Minimum probability of occurrence refers in particular to the minimum confidence of one of the determined sequences of relevant log files with one of the reference patterns. For example the ratio of the number of reference patterns to the number of key parameters is determined.

Additionally or alternatively an original event can be predetermined or determined for one of the determined sequences of relevant log files with this determined sequence of relevant log files being supplemented from the original event with a further log file and an extended sequence of relevant log files being formed.

In one particularly simple analysis, the extended sequence of relevant log files is compared with the reference patterns and if they (the extended sequence and one of the reference patterns) are identical, the extended sequence is supplemented with a further relevant log file; if they are not identical, it is instead determined whether the probability of occurrence of this extended sequence is greater than or smaller than the minimum probability of occurrence.

To further reduce and simplify the analysis of the determined sequences, the original event is deleted if the probability of occurrence of this extended sequence is equal to or smaller than the minimum probability of occurrence.

This extended sequence of relevant log files is preferably determined as a possibly occurring extended sequence of relevant log files, if the sequence length of this extended sequence is greater than the minimum sequence length.

Additionally or alternatively time dependencies can be determined. For example at least the maximum time interval and/or the minimum time interval between adjacent relevant log files within a sequence is/are determined as at least one time parameter for the possibly occurring extended sequence of relevant log files.

The method is preferably used in an automation system of a technical installation, for example a power plant.

In one simple embodiment, the inventive method is implemented in a component of an automation system of a technical installation, with the automation system having at least one operating and observation level, an automation/process level and a field level, which are connected to one another by way of a communication system, with at least one embodiment of the method being implemented in at least one of the levels.

FIG. 1 shows a schematic block diagram of an example embodiment of an automation system 1 of a technical installation, for example a power plant or a chemical installation.

The automation system 1 comprises a number of automation devices 2 in a process level AS (also referred to as the automation level), these being connected to and communicating with one another and a control unit 4 in an operating and observation level BB by way of a shared data bus 3. The automation devices 2 are also connected to field devices 6 in a field level FE by way of a field bus 5 and communicate with one another.

The data bus 3 can be for example an Ethernet bus or another suitable data transmission unit. The field bus 5 can be for example an Ethernet-based field bus 5 or can be wireless or wired in the form of another suitable data transmission unit. The data bus 3 and/or the field bus 5 can form a computer network here.

The automation devices 2 can be constructed from both freely programmable and memory-programmable processors, in particular a processor unit, and each control, regulate and/or monitor a number of component groups 7 or subsystems of the individual installation parts of the technical installation. In particular the controlling, regulating and/or monitoring of the technical installation also includes an analysis and other processing of the data, such as measurement signals, control signals, input and output signals, intermediate signals, stored data, processing data.

The control units 4 can be data processing units, such as a personal computer or another suitable operating and observation unit, by means of which the technical installation is monitored and controlled.

The field devices 6 can be for example compact freely programmable or memory-programmable controllers, in particular a processor unit and/or at least one partially hardwired or logical circuit arrangement, which control, regulate and/or monitor individual components 8 of installation parts, such as detectors (sensors) and/or control elements (actuators), and which are connected to the automation device 2 (also referred to as the control device) for the purpose of communication by way of the field bus 5.

During the operation of a technical installation, for example a power plant, large quantities of data in the form of log files P1 to Pn, which comprise control commands, status reports and/or fault reports, prompted in the control unit 4 by control interventions or shown on screens or other visualization devices of the control unit 4, are moved by way of the data bus 3 and the field bus 5. A plurality of control interventions are required in particular during commissioning and when starting the installation up and shutting it down, these resulting in a correspondingly large number of feedback reports that have to be observed. This represents a not insignificant challenge for operators.

FIG. 2 shows a schematic diagram of an example embodiment of a method for analyzing and evaluating log files P1 to Pn, which are generated in the automation system 1 and transmitted by way of the data bus 3 and/or the field bus 5 and are exchanged between the units of the automation system 1, in particular between the operating units 4, the automation devices 2 and the field devices 6.

The log files P1 to Pn each comprise at least one acquisition time stamp and a text, in particular a message, a report, a status text, describing at least one event. Additionally the log files P1 to Pn can include as text a system time, a version/revision number and further information. A number of log files P1 to Pn for example can describe an event or a number of events here. Different *log, *xml, *txt, *nfo and/or *dmp files for example are produced and generated as log files P1 to Pn in an automation system 1 of a technical installation.

In at least one of the components of the automation system 1, a computer program product in particular is implemented, which can be loaded directly into a memory of a digital computer, such as a control unit 4, and comprises program code parts, which are suitable for performing steps of the method described in the following. Alternatively the computer program product can also be loaded into an automation device.

Alternatively a computer-readable storage medium, e.g. any memory, can be provided, which comprises instructions (e.g. in the form of program codes) that can be executed by a computer, such as a control unit 4, which are such that the control unit 4 performs steps of the method described in the following.

The method for analyzing and/or evaluating at least one event E in the technical installation, which is implemented in the manner of a log analyzer 9, comprises at least the following steps:

determining a number of relevant log files PR1 to PRx from a plurality of log files P1 to Pn generated during ongoing operation of the automation system 1 for one or more events E based on at least one log parameter, encoding the relevant log files PR1 to PRx using at least one associated log code C, predetermining at least one key parameter S for the analysis and/or the evaluation, predetermining for example a key event SE and/or a key time point/period, identifying multiple, in particular duplicated, relevant log files PR1 to PRx based on the at least one key parameter S from the relevant log files PR1 to PRx, and bringing together the relevant log files PR1 to PRx in a number of sequences SQ of relevant log files PR1 to PRx based on the repetition rate of the key parameter S in the time window to be analyzed.

When bringing together and/or determining the relevant log files PR1 to PRx for example all the log files P1 to Pn generated in an acquisition time period of for example 20 s around an occurred, predetermined or selected event E are filtered out from the plurality of generated log files P1 to Pn for analysis as relevant log files PR1 to PRx.

As an alternative to determining and filtering the relevant log files PR1 to PRx, which are to be analyzed more closely, based on their acquisition time stamps, it is also possible to predetermine for example an acquisition site, at which an event E occurred. All the log files generated in the region of the acquisition site are then determined or filtered out and brought together as relevant log files PR1 to PRx. To reduce the number of log files PR1 to PRx to be analyzed and therefore of relevance, alternatively or additionally an acquisition time period and/or an acquisition type can be used as the log parameter or criterion.

During the encoding of the relevant log files PR1 to PRx, these are encoded for example by means of at least one associated log code C in such a manner that the relevant log file PR1 to PRx with the log text "Normal Stop in Progress" for example is encoded with the letter "A" and the one with the log text "Emergency Stop" is encoded for example with the letter "E". This significantly simplifies the analysis and further processing of the relevant log files PR1 to PRx, in that simple analysis algorithms can be used. As an alternative to encoding the relevant log files PR1 to PRx using a letter code, it is also possible to use a different alphanumeric code.

A key event SE and/or a key time point/period in particular is determined or predetermined as the at least one key parameter S for the analysis and/or the evaluation. Thus a failure of a pump can be defined for example as a key event SE, so that when the event E—failure of the pump—occurs, the analysis method is started automatically. In this process all the log files generated in relation to the pump in the predetermined time period, for example 1 s, 50 ms or 20 ms before and after the failure of the pump, are determined and correspondingly encoded as relevant log files PR1 to PRx, for example as a continuous letter chain: A, B, A, C or A, C, D, B, C, A, E, K.

Then, in particular after encoding, multiple, in particular duplicated, relevant log files PR1 to PRx are filtered or removed from the chain of relevant log files PR1 to PRx describing the event E. For example one of the duplicated log files PR1 to PRx with the code "A" is removed from a chain of relevant log files PR1 to PRx with the code sequence A, B, A, C, if there is a time window of less than one minute between these two log files PR1 and PR3 with the code "A". However if the time window between these is longer than one minute, both log files PR1 and PR3 remain in the analysis. The time periods and windows are variable depending on the type of log and the log content of the relevant log files PR1 to PRx in question and can be in the region of milliseconds, seconds or minutes.

The method also provides for the relevant log files PR1 to PRx being grouped into a number of sequences SQ of relevant log files PR1 to PRx based on the repetition rate of the key parameter S in the time window to be analyzed. In particular the relevant log files PR1 to PRx are grouped temporally. For example a first group G1 of relevant log files PR1 to PR7 before the occurrence of the key parameter S, in particular of the key event SE, and a second group G2 of relevant log files PR8 to PR12 after the occurrence of the key parameter S, in particular of the key event SE, are formed. This allows the further analysis to be performed using groups and/or sequences.

In particular by dividing the at least one sequence SQ, which describes the event E, further into groups G1, G2, it is possible to perform a simple and fast group analysis and evaluation of few reports before the occurrence of the key event SE separately from the evaluation of the few reports after the occurrence of the key event SE.

For example the relevant log files PR1 to PRx to be analyzed are encoded with the code sequence "A, C, D, B, C, A, E, K, B, C, D, A, K, E", with the relevant log files PRx with the code "K" being determined as a key event SE. For a separate analysis of the relevant log files PR1 to PRx before and after the key event SE with the code "K" the relevant log files PR1 to PRx can be grouped as follows for example:

$G1=[B,C,A,E,K,B,C]$ or $[B,C,A,E]$ or $[C,D,A]$, $G2=[C,D,A,K,E]$ or $[B,C]$ or $[E]$.

During the initialization or setting up of the method a target event ZE and/or a start event AE can optionally be predetermined or determined as a key parameter S in order to determine and compose the at least one sequence SQ of relevant log files PR1 to PRx to be analyzed.

A minimum sequence length can also optionally be predetermined in order to determine and compose the sequence SQ of relevant log files PR1 to PRx to be analyzed.

The method also provides for example within a determined sequence SQ for the relevant log files PR1 to PRx acquired or generated at the same time and therefore having the same acquisition time stamp to be brought together to form a further group G within the sequence SQ. This allows an accurately timed analysis of relevant log files PR1 to PRx to be separated simple and reliably from other analyses. In particular the time outlay for processing and analyzing time dependencies of the relevant log files PR1 to PRx for the event E to be examined is significantly reduced.

The method also provides for further time dependencies to be determined between the relevant log files PR1 to PRx within the determined sequence SQ and/or the determined group G. For example the relevant log files PR1 to PRx within the determined sequence SQ and/or the determined group G can be sorted in ascending or descending time order and therefore chronologically. Initial reports or start reports can be determined based on the relevant log files PR1 to PRx with the oldest acquisition time stamp. Additionally or alternatively last or end reports can be determined based on the relevant log files PR1 to PRx with the most recent acquisition time stamp. Further time analyses within a sequence SQ or a group G are possible.

In a further step the determined sequences SQ and/or the determined groups G are analyzed for recurring patterns (=log pattern=recurring identical sequence of log files) and pattern recognition is performed. If recurring patterns are identified with the occurrence of the encoded relevant log files PR1 to PRx in the determined sequence(s) SQ and/or the determined group(s) G, at least one of said patterns is determined as the reference pattern RM for the sequence(s) SQ and/or groups(s) G of relevant log files PR1 to PRx to be analyzed, in particular for a time period to be analyzed and/or an event to be analyzed, and stored/predetermined for further processing and analysis.

The determined sequences SQ and/or groups G of relevant log files PR1 to PRx of the time period to be analyzed and/or of the event to be analyzed, in particular those preceding, instantaneous or expected in the future, can then be compared and evaluated based on the determined reference pattern RM.

Additionally statistical methods can be used to determine the occurrence of relevant log files PR1 to PRx around an even E to be analyzed and the occurrence of the event E itself based on the determined order of generated relevant log files PR1 to PRx. It is thus possible to determine a minimum probability of occurrence Wmin (=minimum confidence or minimum support in %) for the event E based on the determined number of sequences SQ with reference patterns RM and the determined number of key parameters S in a considered time period.

The determined relevant log files PR1 to PRx, the determined sequences SQ of relevant log files PR1 to PRx, the determined groups G, G1, G2 of relevant log files PR1 to PRx and/or the determined minimum probabilities of occurrence Wmin for one or more events E can then be saved in a memory 10.

Alternatively these can be supplied to the control unit 4 for outputting on a screen and for further analysis and evaluation of the event(s) E, in particular for the determination of the probability of occurrence W of the event.

It is then possible with the saved relevant log files PR1 to PRx based on further filtering or processing algorithms to filter out or remove the relevant log files PR1 to PRx and/or sequences SQ of relevant log files PR1 to PRx for the further reduction of the number of relevant log files PR1 to PRx and/or sequences SQ thereof to be examined, if their probability of occurrence W is smaller than the minimum probability of occurrence Wmin.

In a further embodiment an original event UE is predetermined or determined for one of the determined sequences SQ of relevant log files PR1 to PRx and this determined sequence SQ of relevant log files PR1 to PRx is supplemented with a further log file PR+1 and an extended sequence SQ+1 of relevant log files PR1 to PRx, PR+1 is formed.

In a further analysis using the log analyzer 9 for example the extended sequence SQ+1 of relevant log files PR1 to PRx with the further log file PR+1 (for example SQ with A, B extended to SQ+1 with A, B, C) can be compared with the determined reference pattern RM. If this extended sequence SQ+1 is identical to the reference pattern RM, a further log file PR+1 is supplemented, for example SQ with A, B and SQ+1 with A, B, C, D.

If it is not identical, it is determined whether the probability of occurrence W of this extended sequence SQ+1 is greater or smaller than the minimum probability of occurrence Wmin. If the probability of occurrence W of this extended sequence SQ+1 is equal to or smaller than the minimum probability of occurrence Wmin, the original event UE is deleted from this extended sequence SQ+1.

The implemented method can also be used to determine this extended sequence SQ+1 of relevant log files PR1 to PRx, PR+1 as a possibly occurring extended sequence SQ+1 of relevant log files PR1 to PRx, PR+1, if the sequence length of this extended sequence SQ+1 is longer than the minimum sequence length.

Additionally provision can be for further analysis in that at least the maximum time interval and/or the minimum time interval between adjacent relevant log files PRx−1, PRx, PRx+1 within this extended sequence SQ+1 is/are determined as at least one time parameter for the possibly occurring extended sequence SQ+1 of relevant log files PR1 to PRx, PR+1. This allows the determination of further time dependencies of relevant log files PR1 to PRx for the event E in question and further determinations of statistical correlations of the relevant log files PR1 to PRx around the event E in question.

It is also possible to determine analyses relating to the origin or trigger of the considered event E.

The implemented method of the log analyzer 9 allows simple automatic analysis of relevant log files PR1 to PRx generated at times around a key event SE and the automatic determination of reference patterns RM for generated sequences SQ of relevant log files PR1 to PRx describing and representing the key event SE.

Although the invention has been illustrated and described in detail using preferred example embodiments, the invention is not limited by the disclosed examples and other variations can be derived therefrom by the person skilled in the art without departing from the scope of protection of the invention. In particular the log analyzer 9 can be implemented at an appropriate point in a component of the automation system 1.

What is claimed is:

1. A method for at least one of analyzing and evaluating at least one event of a technical installation from a plurality of generated log files of an automation system of the technical installation, comprising:
   determining a number of relevant log files based on at least one log parameter;
   encoding the relevant log files by way of at least one associated log code;
   determining at least one key parameter for the at least one of analysis and evaluation of the event;
   identifying multiple relevant log files based on the at least one key parameter from the relevant log files; and
   grouping the relevant log files into a number of sequences of relevant log files based on the repetition rate of the at least one key parameter in a time window to be analyzed.

2. The method of claim 1, wherein a target event and a start event for at least one sequence of relevant log files are determined as the at least one key parameter.

3. The method of claim 2, wherein a minimum sequence length for a sequence of relevant log files is determined as at least one key parameter.

4. The method of claim 1, wherein a number of relevant log files with identical acquisition time stamps are brought together to form at least one group of relevant log files.

5. The method of claim 1, wherein at least one reference pattern is identified for a sequence of relevant log files of at least one of a time period and an event to be analyzed.

6. The method of claim 5, wherein the determined sequences of relevant log files of the at least one of time period and event to be analyzed are compared and evaluated based on the reference pattern.

7. The method of claim 5, wherein the determined groups of relevant log files of the at least one of time period and event to be analyzed are compared and evaluated based on the reference pattern.

8. The method of claim 1, wherein a minimum probability of occurrence is determined for the event based on the determined number of sequences of relevant log files with reference patterns and the determined number of key parameters.

9. The method of claim 1, wherein an original event is determined for one of the determined sequences of relevant log files and the determined sequences of relevant log files are supplemented with a further log file and an extended sequence of relevant log files is formed.

10. The method of claim 9, wherein the extended sequence of relevant log files is compared with the reference pattern and if they are identical, the extended sequence is supplemented with a further log file and if they are not identical, it is determined whether the probability of occurrence of the extended sequence is greater than or smaller than the minimum probability of occurrence.

11. The method of claim 10, wherein the original event is deleted, if the probability of occurrence of the extended sequence is equal to or smaller than the minimum probability of occurrence.

12. The method of claim 10, wherein this extended sequence of relevant log files is determined as a possibly occurring extended sequence of relevant log files, if the sequence length of this extended sequence is greater than the minimum sequence length.

13. A method for at least one of analyzing and evaluating at least one event of a technical installation from a plurality of generated log files of an automation system of the technical installation, comprising:
   determining a number of relevant log files based on at least one log parameter;
   encoding the relevant log files by way of at least one associated log code;
   determining at least one key parameter for the at least one of analysis and evaluation of the event;
   identifying multiple relevant log files based on the at least one key parameter from the relevant log files; and
   grouping the relevant log files into a number of sequences of relevant log files based on the repetition rate of the at least one key parameter in a time window to be analyzed, wherein at least one of the maximum time interval and the minimum time interval between adjacent relevant log files within this extended sequence is determined as at least one time parameter for the possibly occurring extended sequence of relevant log files.

14. A method, comprising:
   using the method of claim 1 in an automation system of a technical installation.

15. An automation system of a technical installation, comprising:
   at least one operating and observation level;
   an automation level and a field level, connected to one another by way of a communication system, the method of claim 1 being implemented in at least one of the levels.

16. The method of claim 2, wherein a number of relevant log files with identical acquisition time stamps are brought together to form at least one group of relevant log files.

17. The method of claim 3, wherein a number of relevant log files with identical acquisition time stamps are brought together to form at least one group of relevant log files.

18. The method of claim 2, wherein at least one reference pattern is identified for a sequence of relevant log files of at least one of a time period and an event to be analyzed.

19. The method of claim 2, wherein the determined sequences of relevant log files of the at least one of time period and event to be analyzed are compared and evaluated based on the reference pattern.

20. The method of claim 6, wherein the determined groups of relevant log files of the at least one of time period and event to be analyzed are compared and evaluated based on the reference pattern.

21. The method of claim 11, wherein this extended sequence of relevant log files is determined as a possibly occurring extended sequence of relevant log files, if the sequence length of this extended sequence is greater than the minimum sequence length.

22. A method, comprising:
   using the method of claim 13 in an automation system of a technical installation.

23. An automation system of a technical installation, comprising:
   at least one operating and observation level;
   an automation level and a field level, connected to one another by way of a communication system, the method of claim 13 being implemented in at least one of the levels.

* * * * *